(12) United States Patent
Lazarevich et al.

(10) Patent No.: US 6,779,824 B1
(45) Date of Patent: Aug. 24, 2004

(54) VEHICLE CARGO TRAY AND TABLE ASSEMBLY

(75) Inventors: Robert R Lazarevich, Rochester, MI (US); Paul Steffes, Oxford, MI (US); Thomas C Booth, Roseville, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/456,642

(22) Filed: Jun. 6, 2003

(51) Int. Cl.[7] ............................................. B60P 1/267
(52) U.S. Cl. ....................... 296/50; 296/57.1; 296/37.6
(58) Field of Search ..................... 296/50, 57.1, 37.6, 296/26.11, 165, 100.07, 100.06, 26.09, 56, 100.09, 26.05, 26.06; 224/403, 404, 542, 282

(56) References Cited

U.S. PATENT DOCUMENTS

| | | | | |
|---|---|---|---|---|
| 4,171,844 A | * | 10/1979 | Landaal et al. | 296/57.1 |
| 4,580,828 A | * | 4/1986 | Jones | 296/57.1 |
| 4,778,213 A | * | 10/1988 | Palmer | 296/57.1 |
| 4,861,088 A | * | 8/1989 | Fedrigo | 296/57.1 |
| 5,215,346 A | * | 6/1993 | Reitzloff et al. | 296/37.6 |
| 5,468,037 A | * | 11/1995 | Peterson et al. | 298/57.1 |
| 5,518,158 A | * | 5/1996 | Matlack | 296/37.6 |
| 5,556,152 A | * | 9/1996 | Dunlap et al. | 296/57.1 |
| 5,741,039 A | * | 4/1998 | Habdas | 296/57.1 |
| 5,743,589 A | * | 4/1998 | Felker | 296/57.1 |
| 5,975,610 A | * | 11/1999 | Tracy | 296/57.1 |
| 6,015,071 A | | 1/2000 | Adomeit et al. | |
| 6,113,172 A | | 9/2000 | Chaloult et al. | |
| 6,247,741 B1 | * | 6/2001 | Seel et al. | 296/37.14 |
| 6,253,943 B1 | | 7/2001 | Spykerman et al. | |
| 6,290,277 B1 | * | 9/2001 | Spykerman et al. | 296/37.5 |
| 6,293,602 B1 | * | 9/2001 | Presley | 296/57.1 |
| 6,302,465 B1 | * | 10/2001 | Faber et al. | 296/50 |
| 6,338,518 B1 | * | 1/2002 | D'Annunzio et al | 296/37.16 |
| 6,338,519 B2 | * | 1/2002 | Decker et al. | 296/50 |
| 6,364,391 B1 | * | 4/2002 | Everett | 296/57.1 |
| 6,375,055 B1 | * | 4/2002 | Spykerman et al. | 224/542 |
| 6,471,279 B2 | * | 10/2002 | Pommeret | 296/57.1 |
| 6,488,168 B1 | | 12/2002 | Wang | |
| 6,516,983 B2 | | 2/2003 | Sotiroff et al. | |
| 6,520,364 B2 | | 2/2003 | Spykerman et al. | |
| 6,588,822 B1 | * | 7/2003 | Duvall, Jr. | 296/57.1 |
| 6,641,190 B2 | * | 11/2003 | Kirchhoff | 296/57.1 |
| 6,648,398 B2 | * | 11/2003 | Duffy | 296/37.6 |
| 2002/0109369 A1 | * | 8/2002 | Boomhower et al. | 296/57.1 |
| 2003/0000980 A1 | * | 1/2003 | Muizelaar et al. | 296/37.1 |
| 2003/0122396 A1 | * | 7/2003 | Humphrey et al. | 296/51 |

* cited by examiner

*Primary Examiner*—Kiran Patel
(74) *Attorney, Agent, or Firm*—Donald J. Wallace

(57) ABSTRACT

A cargo tray and table assembly for a motor vehicle having an enclosed rear cargo area including a floor portion and an opening. The assembly includes a main body coupled to a pivot system. The pivot system is further coupled to the rear cargo area of the vehicle. The pivot system is operable to move the main body between a stowed position within the rear cargo area and a use position.

5 Claims, 10 Drawing Sheets

US 6,779,824 B1

VEHICLE CARGO TRAY AND TABLE ASSEMBLY

FIELD OF THE INVENTION

The present invention relates to cargo systems, and more particularly to a molded flip and stow tailgate for use in the rear cargo compartment of a vehicle.

BACKGROUND OF THE INVENTION

Motor vehicles having a rear hatch, for example, a van, minivan, SUV or station wagon, have been designed to provide the functionality of a truck with the comfort level of a car. Unlike a truck, motor vehicles with rear hatches are unable to extend their rear cargo areas by lowering a tailgate. Furthermore, these vehicles lack the other conveniences provided by a tailgate such as "tailgating" at sporting events. Accordingly, a need exists for a motor vehicle having a rear hatch and a tailgate.

SUMMARY OF THE INVENTION

The present invention provides a tailgate for a motor vehicle having an enclosed rear cargo area including a floor portion and an opening. The tailgate has a main body with one end coupled to a pivot system. The pivot system is further coupled to the rear cargo area of the vehicle. The pivot system is operable to move the main body of the tailgate between a stowed position within the rear cargo area and a flipped position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The present invention is generally related to a flip and stow tailgate for a motor vehicle. The flip and stow tailgate will be described as depicted in FIGS. 1–10, wherein common reference numbers are utilized to represent the same or similar elements. Further, the flip and stow tailgate will be described in the context of a flip and stow tailgate for use in a rear cargo area of a minivan having a rear opening with a rear lift gate. However, it is to be understood that the principles embodied herein are equally applicable to other types of vehicles and vehicle configurations.

Figure 1:
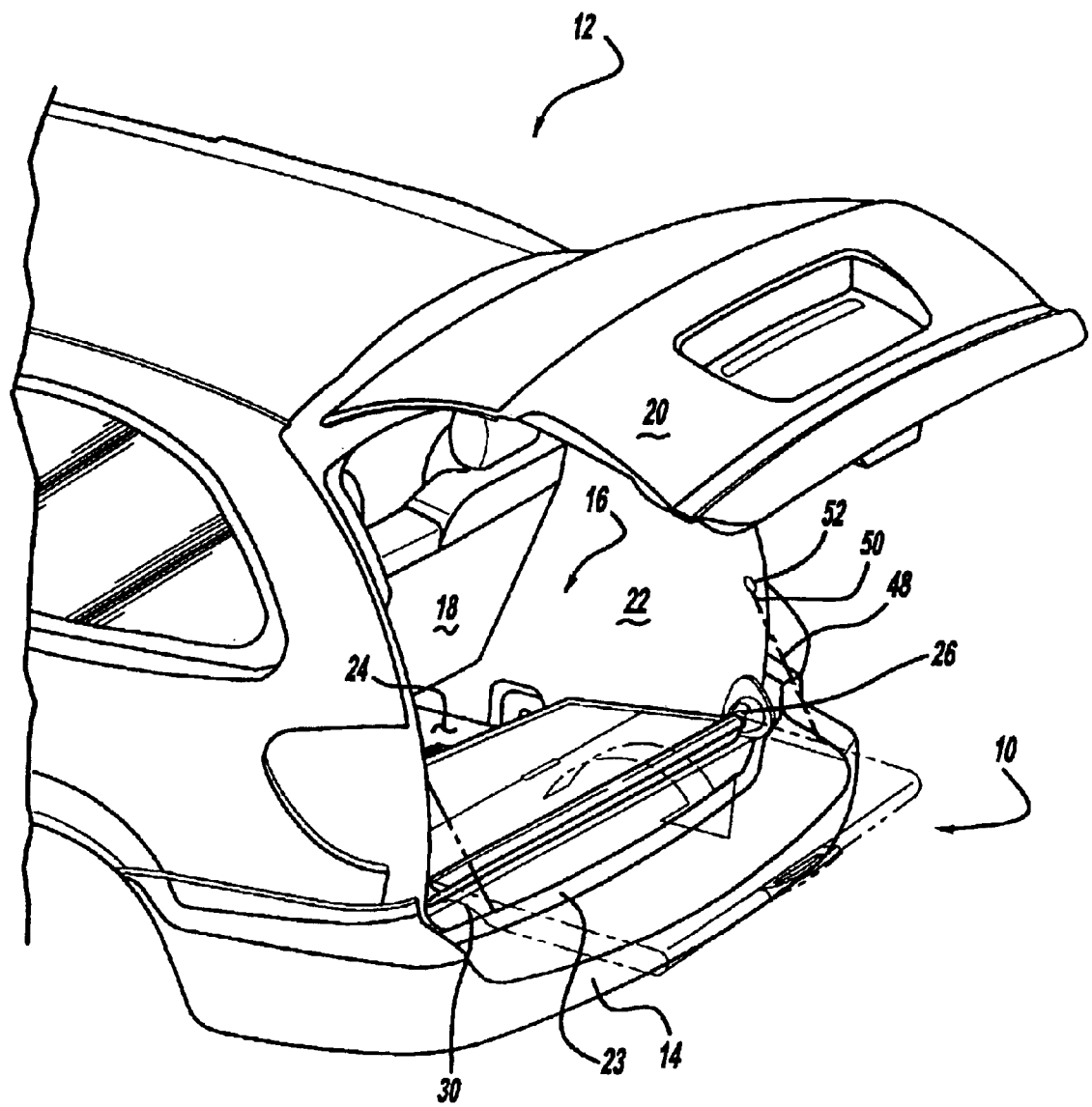
FIG. 1 is a perspective view of a vehicle with a flip and stow tailgate according to the principles of the present invention.

Referring to FIG. 1, a flip and stow tailgate 10 for a vehicle 12 is shown in a stowed position. A deployed or flipped position is indicated by broken lines. The vehicle 12 has a rear fascia 14 for providing additional support to the flip and stow tailgate 10 in the flipped position. The vehicle 12 further includes an enclosed rear cargo area 16 defined as the area behind a rear seat 18 up to a lift gate 20. The rear cargo area 16 stores the flip and stow tailgate 10 in the stowed position. The rear cargo area 16 further includes a pair of interior sidewalls 22, a lift gate sill 23 and a floor portion 24.

Figure 2:
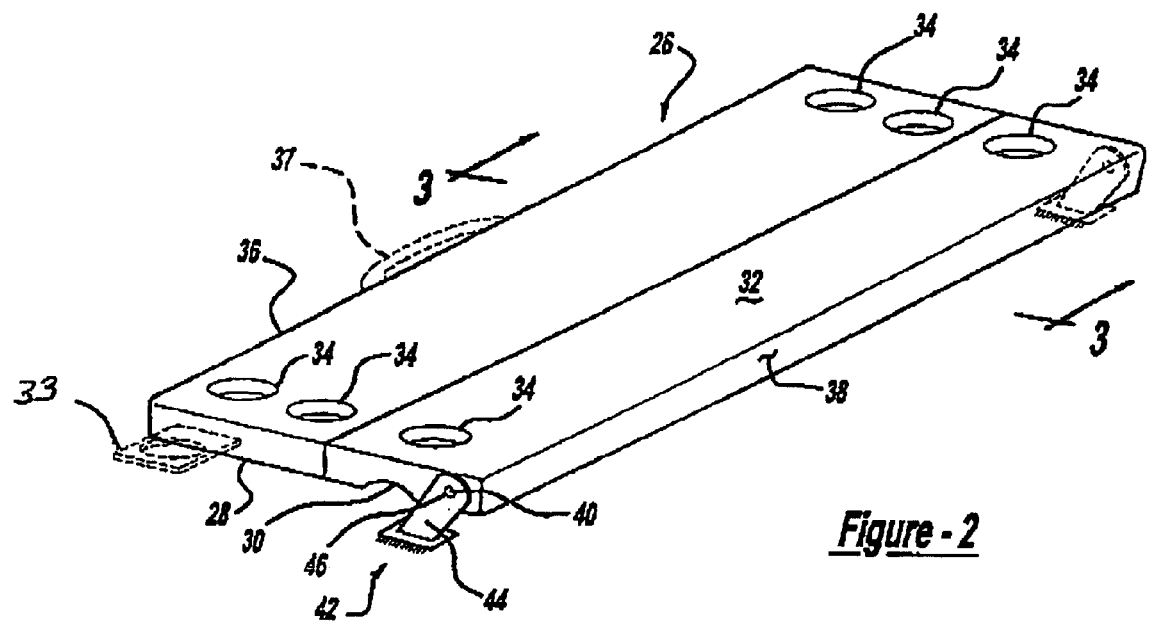
FIG. 2 is a reverse perspective view of the flip and stow tailgate of FIG. 1 in the flipped position.
Figure 3:
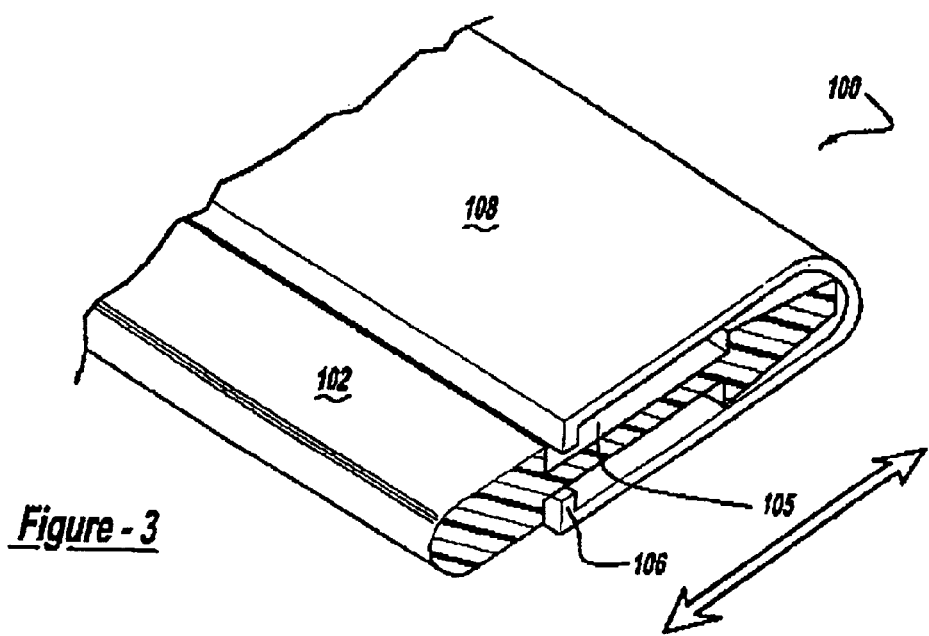
FIG. 3 is a cross section of an alternate embodiment flip and stow tailgate according to the principles of the present invention.

With reference now to FIG. 2, the flip and stow tailgate 10 has a main body 26. In a first embodiment, the main body 26 has a uniform cross section (not shown). The main body 26 is made from blow molded polyethylene, however, various other materials and methods of manufacture such as vacuum forming could also be employed. In one embodiment, as shown in the cross-section of FIG. 3, the main body has a two-piece body construction 100. The two-piece body construction 100 comprises a first section 102 and a second section 108. The first section 102 has a slot portion 105 for receipt of a notched portion 106 on the second section 108. The engagement of the notched portion 106 with the slot portion 105 enables the two-piece body construction 100 to be extended providing greater surface area.

Referring back to FIG. 2, the main body 26 has a first surface 28. The first surface 28 has a formation 30 for maintaining clearance to the lift gate sill 23 and to mate locally with the rear fascia 14 (as shown in FIG. 1). The main body 26 further includes a second surface 32. The second surface 32 has at least one molded in feature 34. In one example, the molded in feature 34 is a cup holder. Other molded in features 34 could be molded into the second surface 32 as desired. Furthermore, the main body 26 can be fitted with a side-mounted slide-out cupholder 33 as shown in phantom in FIG. 2. The main body 26 also has a first end 36 located adjacent to the rear seat 18 when the flip and stow tailgate 10 is in the stowed position and is positioned outside the rear cargo area 16 in the flipped position. Alternatively, the first end 36 may include a handle 37 as a convenience for the user. Additionally, a pocket (not shown) may be molded into the main body 26 to form a grip for rotating the main body 26. The main body 26 also includes a second end 38. The second end 38 is located adjacent to the lift gate 20 when the lift gate 20 is closed and the flip and stow tailgate 10 is in the stowed position. The second end 38 further includes a pair of protrusions 40. The protrusions 40 on the second end 38 couple the main body 26 to a pivot system 42.

The pivot system 42 includes a pair of brackets 44 each having a hole 46. The brackets 44 are coupled to the floor portion 24 of the vehicle 12. The holes 46 in the brackets 44 engage the protrusions 40 from the second end 38 of the main body 26 and enable the main body 26 to rotate. The main body 26 rotates a maximum of 180 degrees, from the stowed position to the flipped position as shown in FIG. 1.

With reference to FIG. 1, the flip and stow tailgate 10 further includes a pair of cables or support straps 48. The support straps 48 provide the primary support for the flip and stow tailgate 10 in the flipped position. In particular, the support straps 48 couple the main body 26 of the flip and stow tailgate 10 to the interior sidewall 22 of the vehicle 12. In one example, the support straps 48 have an eyelet 50 at each end. The eyelet 50 is used to attach the support straps 48 to a pair of hooks 52 on the main body 26 and interior sidewall 22. It is to be understood, however, that a variety of other attachment mechanisms can be employed to secure the support straps 48 to the main body 26 and interior sidewall 22.

Figure 4:
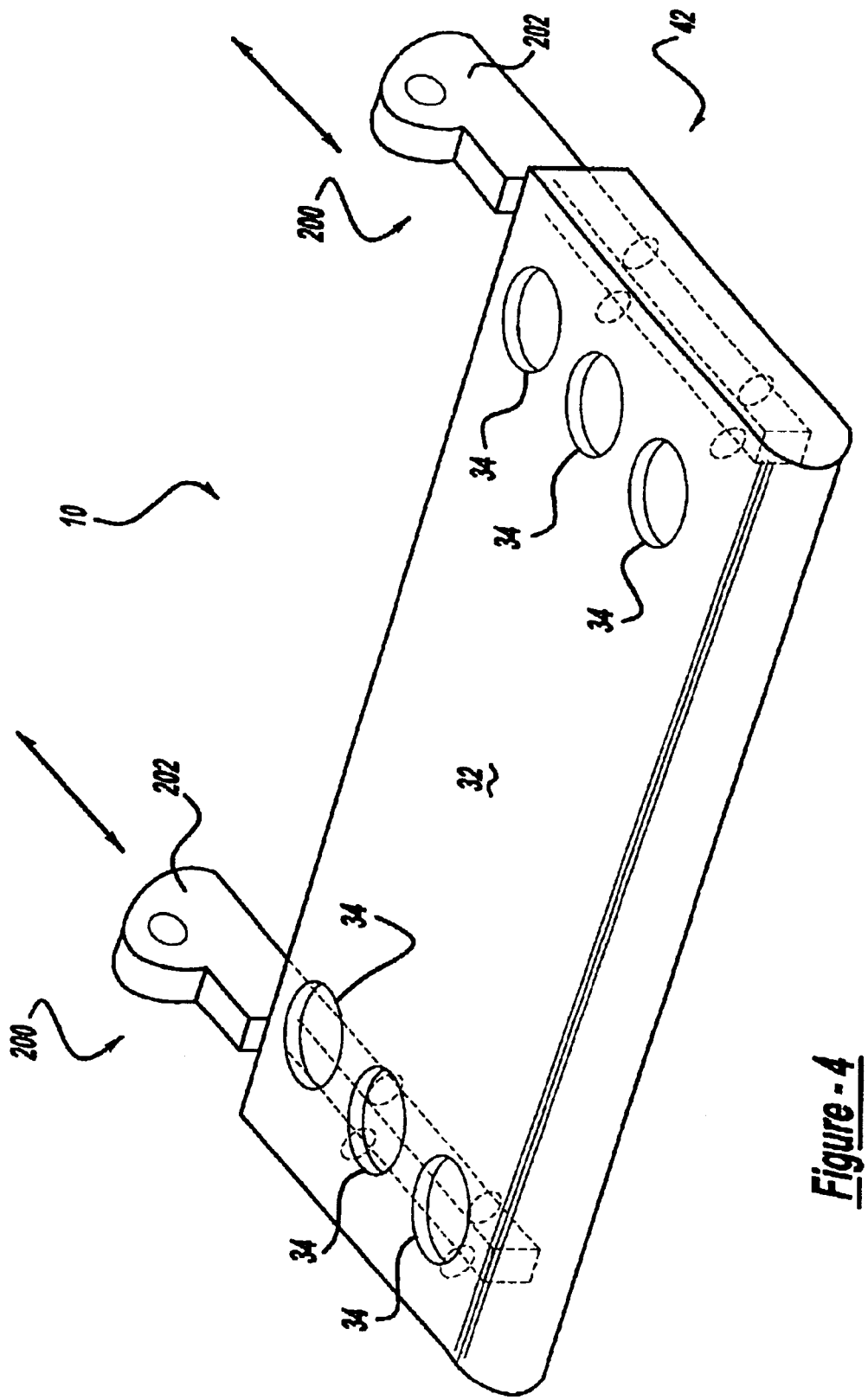
FIG. 4 is a perspective view of a second alternate embodiment of the flip and stow tailgate in a flipped position according to the principles of the present invention.

Referring to FIG. 4, a second alternative embodiment for the flip and stow tailgate 10 is shown. The main difference in this embodiment is the pivot system 200. In this embodiment, the pivot system 200 includes a pair of linkages 202 used for mating with the pair of brackets 44. A pin (not shown) couples the linkages 202 to the holes formed in the brackets 44. The linkages 202 allow the flip and stow tailgate 10 to be extended fore and aft, similar to an airline tray table, to effectively extend the length of the floor portion 24 of the vehicle 12 when the flip and stow tailgate 10 is in the flipped position.

Figure 5:
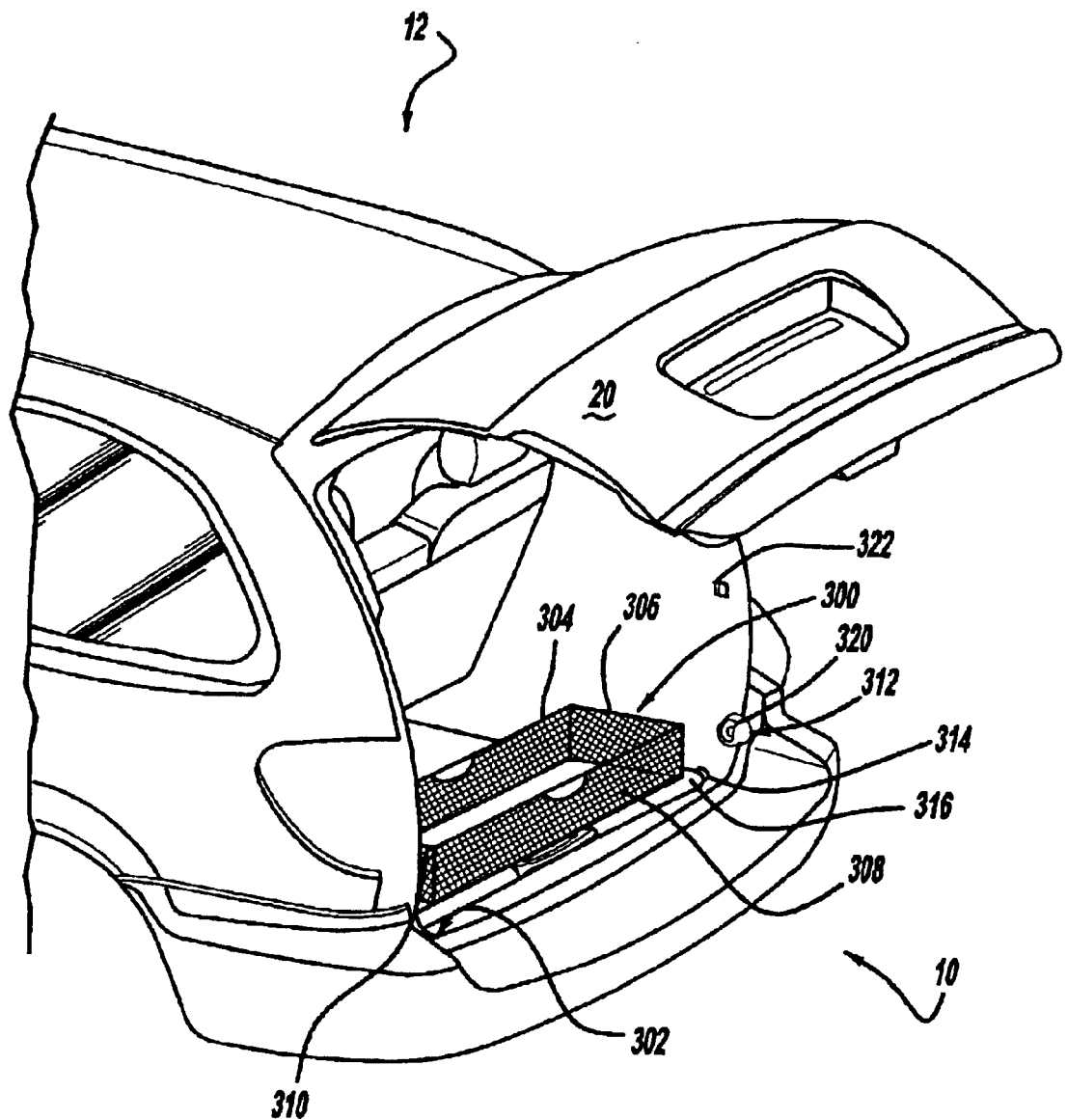
FIG. 5 is a perspective view of a third alternate embodiment of the flip and stow tailgate in a stowed position according to the principles of the present invention.
Figure 5A:
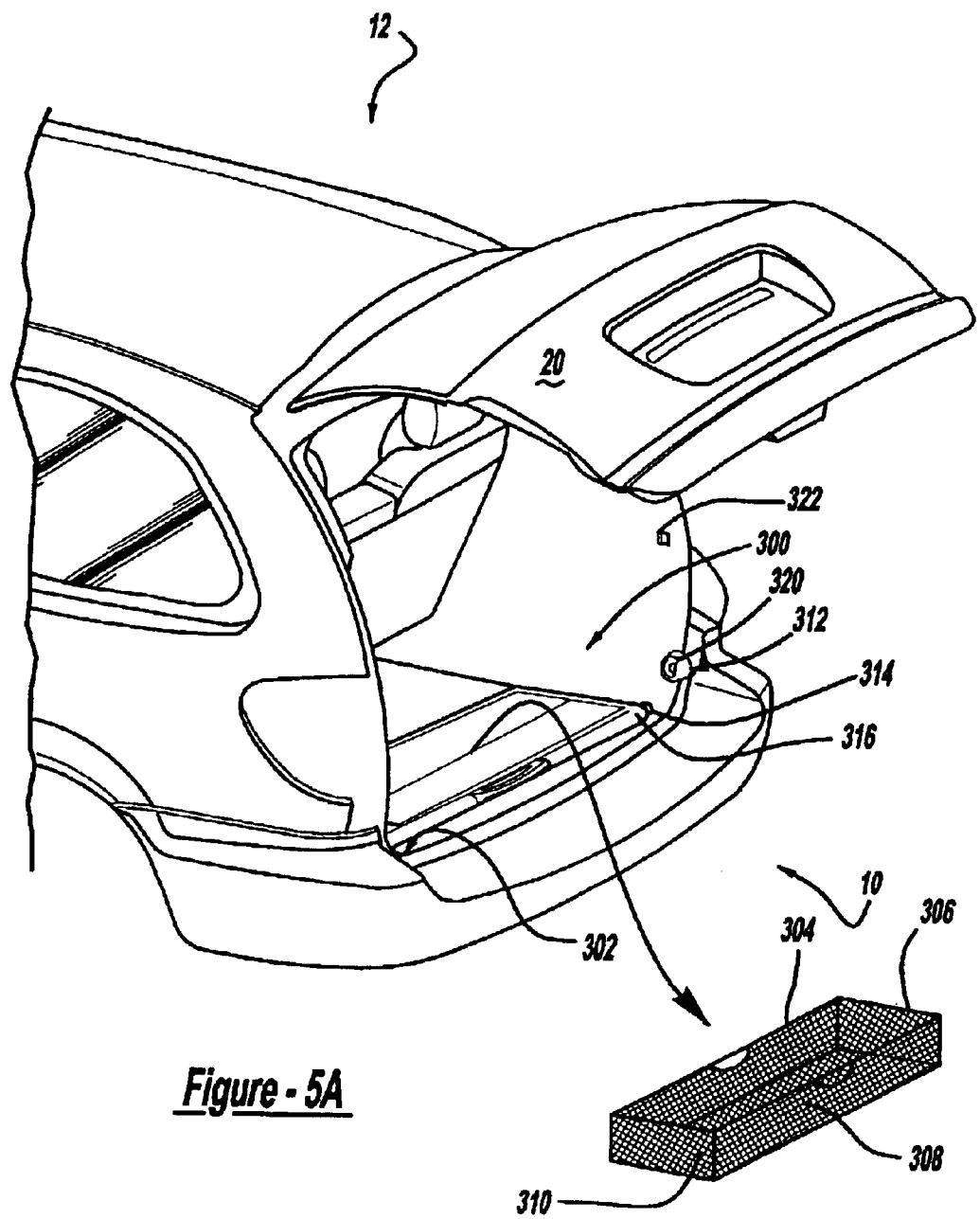
FIG. 5A is a perspective view of a "tote" detachable from the flip and stow tailgate of FIG. 4.
Figure 5B:
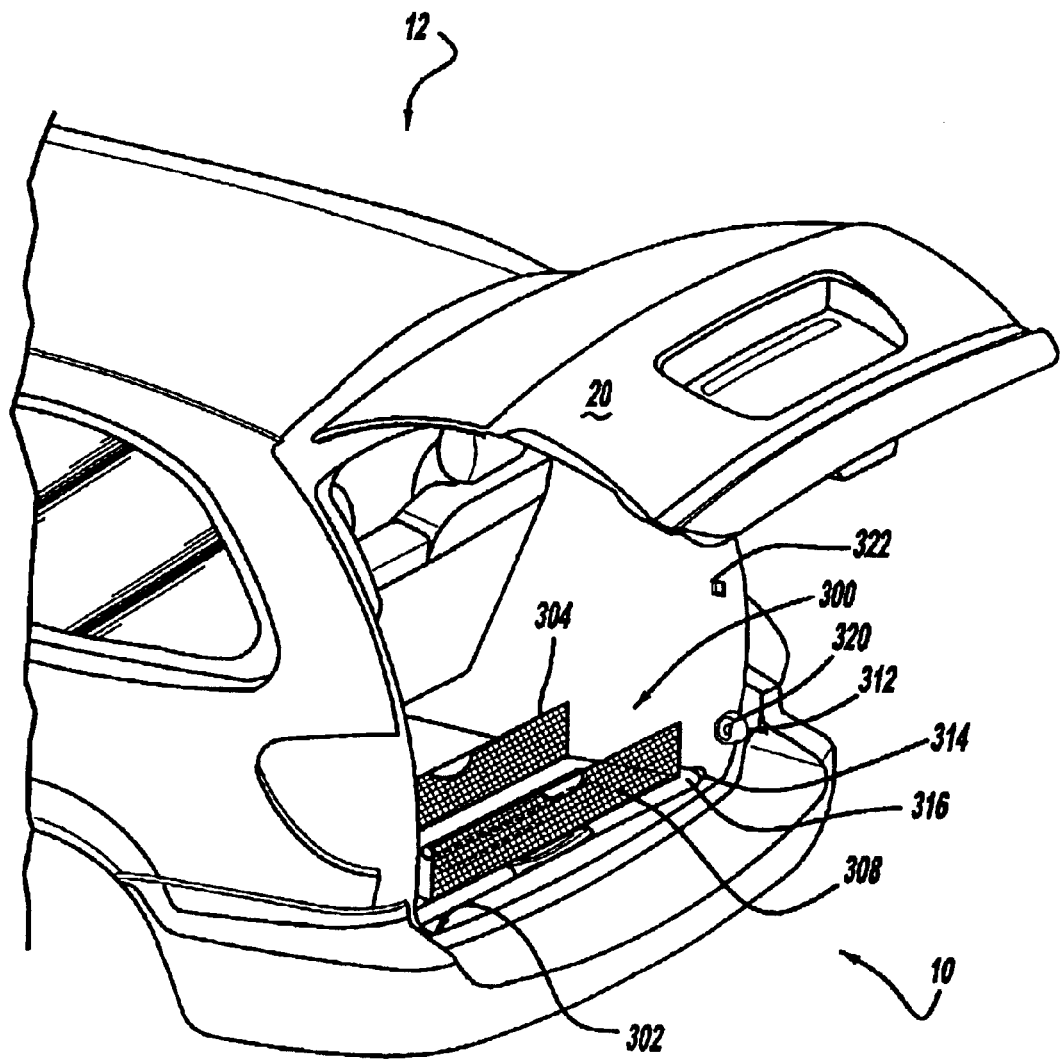
FIG. 5B is an alternative embodiment of the cargo container as shown in FIG. 5.
Figure 6:
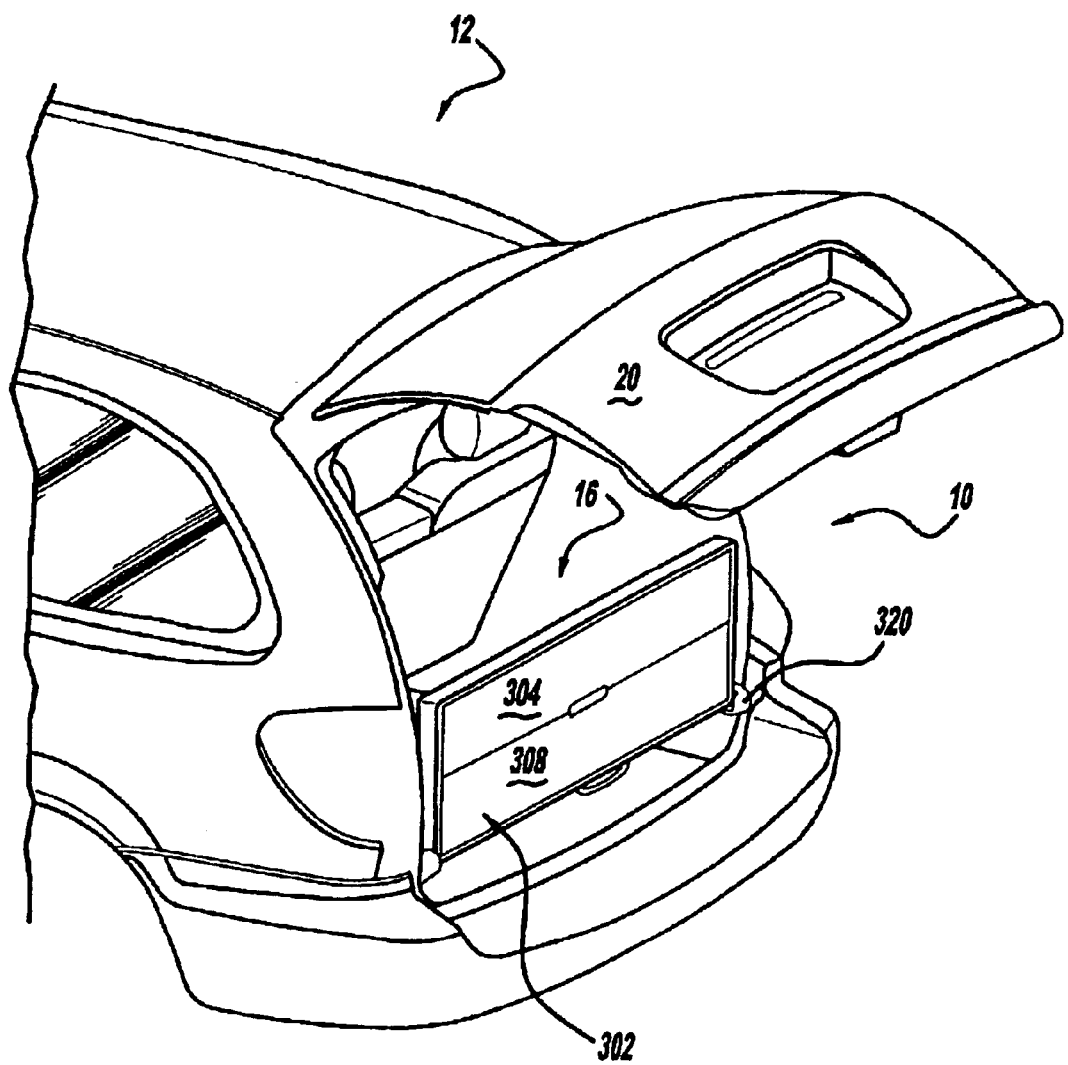
FIG. 6 is a perspective view of the flip and stow tailgate of FIG. 5 in a first flipped position.
Figure 7:
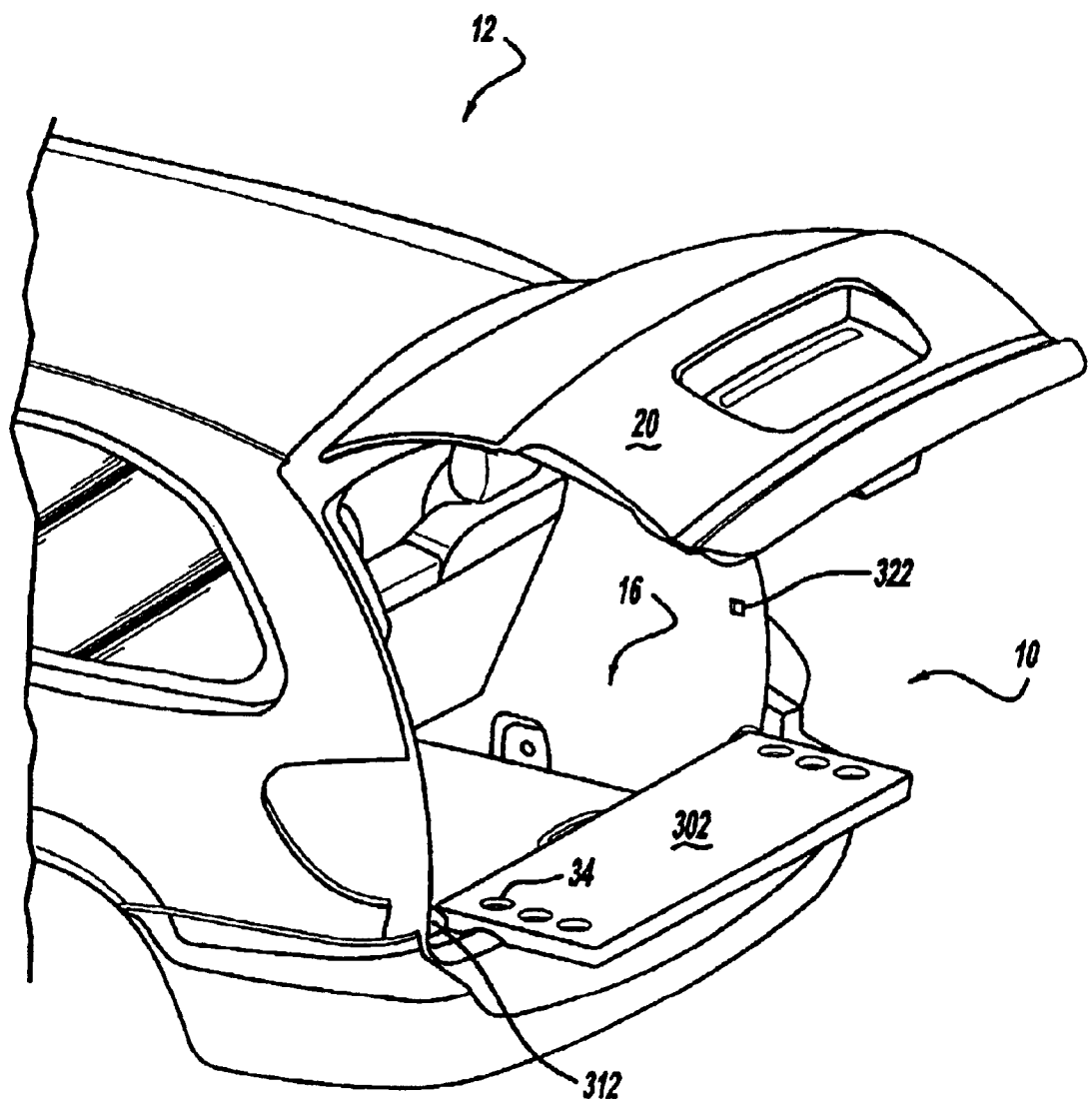
FIG. 7 is a perspective view of the flip and stow tailgate of FIG. 5 in a second flipped position.
Figure 7A:
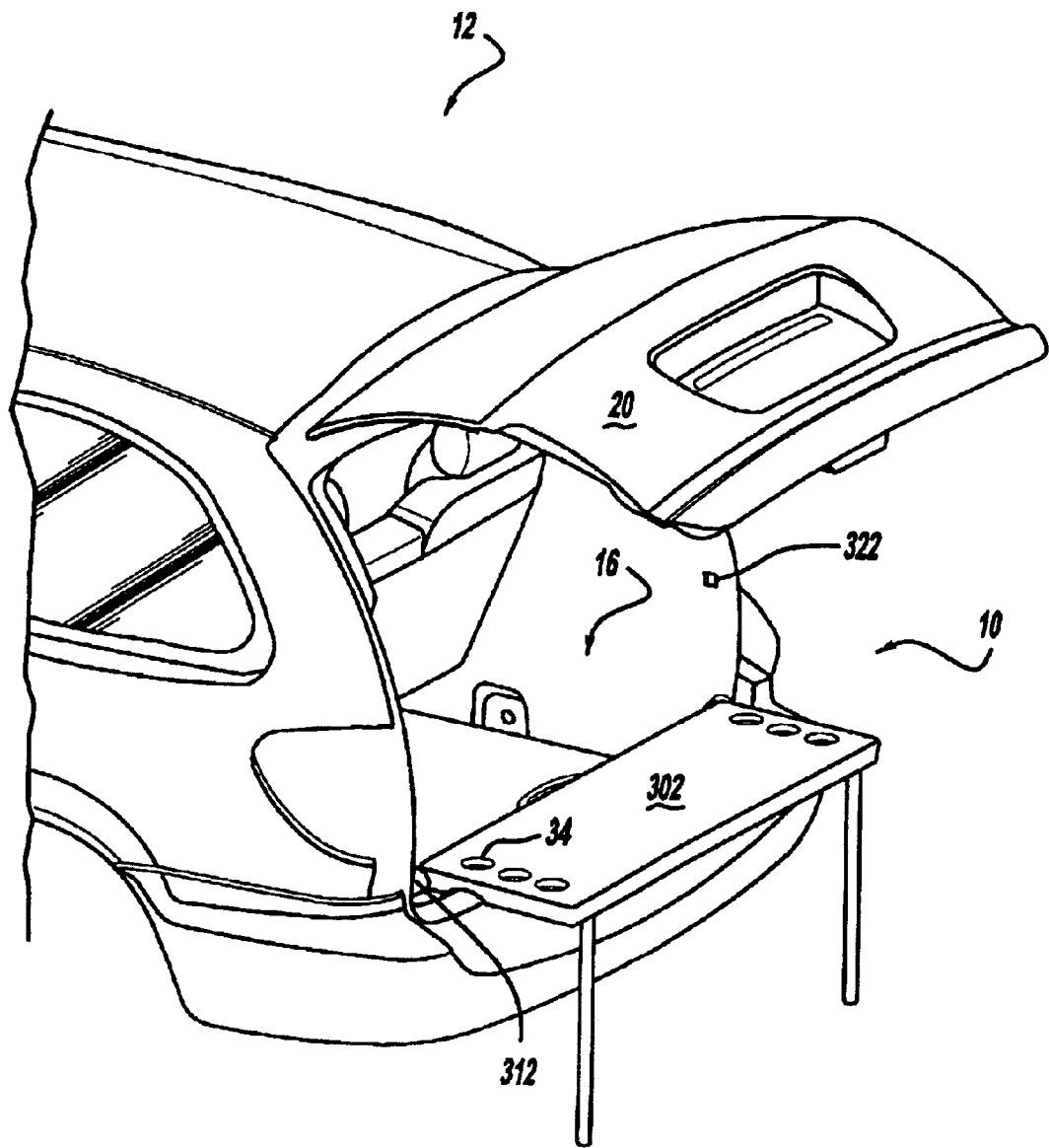
FIG. 7A is a perspective view of the flip and stow tailgate of FIG. 5B in a flipped position'

FIG. 5 shows a third alternative embodiment of the flip and stow tailgate 10 in a stored position. In this embodiment, the flip and stow tailgate 10 incorporates a cargo container 300 on a main body 302. The cargo container 300 has a first side, a second side, a third side and a fourth side 304, 306, 308 and 310 respectively. The sides 304, 306, 308, 310 snap into place and can be folded into a storage position as shown in FIG. 6. Specifically, the second and fourth sides 306, 310 fold inward first, and then the first and third sides 304, 308 fold over to create a flat surface. Alternatively, the cargo container 300 can be detached from the flip and stow tailgate 10 to create a "tote" as shown in FIG. 5A. Additionally, instead of the cargo container 300, the main body 302 could contain a pair of legs retained behind the first and third sides 304, 308 in a storage position as shown in FIG. 5B. Then, when the flip and stow tailgate 10 is in the flipped position as shown in FIG. 7, the legs can be extended to provide additional support to the flip and stow tailgate 10 as shown in FIG. 7A.

Referring back to FIG. 5, a pivot mechanism 312 is shown. In this embodiment, a pair of protrusions 314 on a second end 316 of a main body 318 engage a pair of raised brackets 320. With reference to FIG. 6, the flip and stow tailgate 10 can be locked into a vertical position by the brackets 320 and detents 322 (as shown in FIG. 5) on the interior sidewall 22 of the rear cargo area 16. This allows for retaining items within a rear cargo area 324 such as, for example, pets or loose materials.

Figure 8:
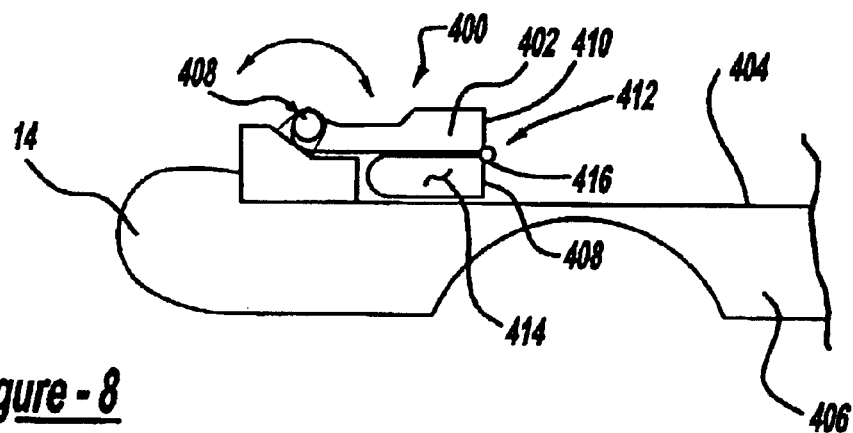
FIG. 8 is a side view of a fourth alternate embodiment of the flip and stow tailgate in a stowed position according to the principles of the present invention.

A fourth alternative embodiment for the flip and stow tailgate 400 is shown in a stowed position in FIG. 8. In this embodiment, a main body 402 of the flip and stow tailgate 400 is stowed on a floor portion 404 of a vehicle 406. Additionally, the main body 402 is coupled to a pivot system 408 and a first end 410 of the main body 402 is attached to a secondary pivot system 412. The secondary pivot system 412 couples the main body 402 to a secondary body 414 and enables further extension of the flip and stow tailgate 400 outside of the vehicle 406. The secondary pivot system 412 includes a pair of brackets 416 fixedly attached to the first end 410 of the main body 402 and at a first end 418 of the secondary body 414.

Figure 9:
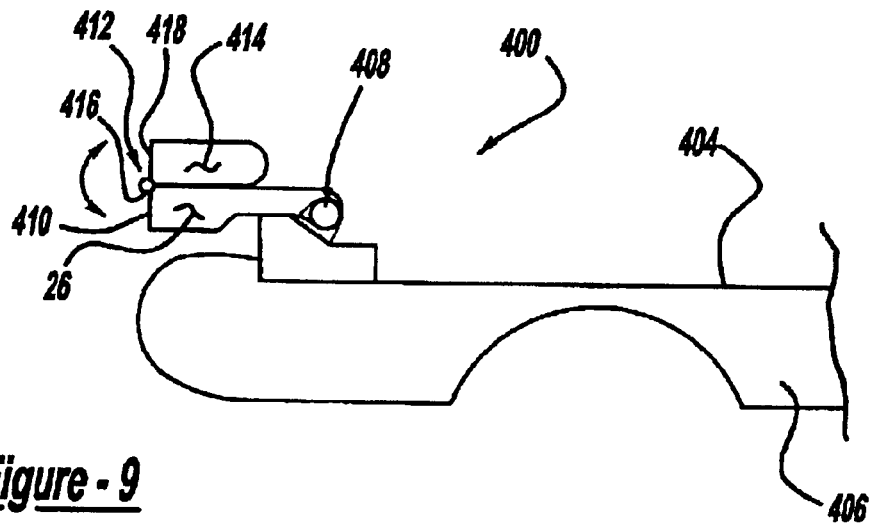
FIG. 9 is a side view of the flip and stow tailgate of FIG. 8 in a partially flipped state.
Figure 10:
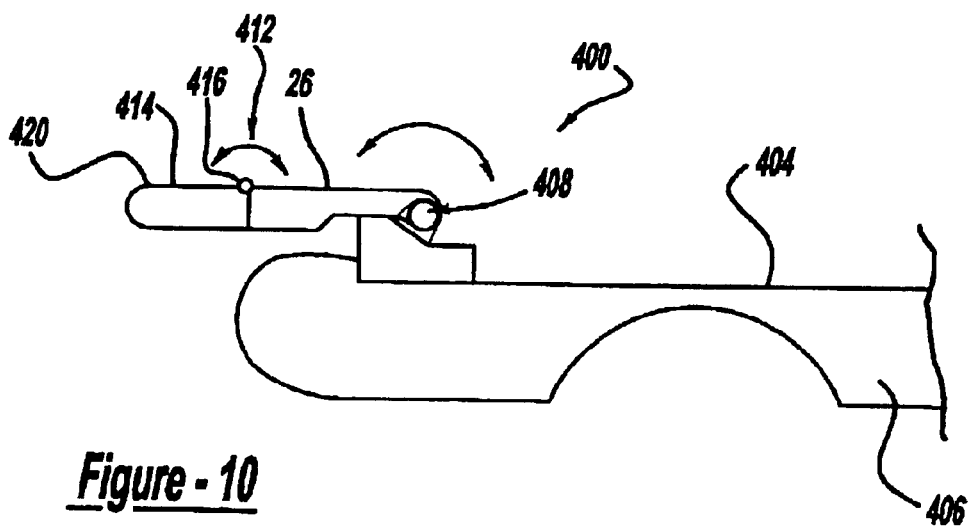
FIG. 10 is a side view of the flip and stow tailgate of FIG. 8 in a fully flipped state.

Referring now to FIG. 9, the flip and stow tailgate 400 is shown in a partially flipped position. In particular, the main body 402 has been rotated 180 degrees by the pivot system 408. FIG. 10 shows the flip and stow tailgate 400 in a fully flipped position wherein the secondary body 414 has been rotated about 180 degrees with respect to the main body 402. The secondary body 414 may also include at least one molded in feature (not shown) on a first side 420 of the secondary body. These molded in features may include cup holders and the like.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A cargo tray and table assembly for a motor vehicle having a fully enclosed rear cargo area defined by a floor portion, a pair of interior sidewalls, a ceiling and a rear lift gate for accessing the enclosed cargo area, the cargo tray and table assembly comprising:

a primary body having a first end;

a pivot mechanism coupled to the first end and to the floor portion of the rear cargo area of the motor vehicle, operable to rotate the primary body between a stowed position on the floor portion of the rear cargo area and a use position; wherein the primary body can extend exteriorly to the vehicle when the rear lift gate is open; and wherein at least one support is coupled to at least one of the interior sidewalls and the primary body to support the primary body in the use position.

2. The cargo tray and table assembly of claim 1 wherein the use position is about 180 degrees from the stowed position and extends through the opening.

3. The cargo tray and table assembly of claim 1 wherein the primary body includes a first side adjacent to the floor portion when the tailgate is in the stowed position.

4. The cargo tray and table assembly of claim 3 wherein the first side includes at least one molded-in feature.

5. The cargo tray and table assembly of claim 1 wherein the primary body further includes a second end opposite the first end to which a handle is fixedly attached.

* * * * *